United States Patent
Palvadeau et al.

(10) Patent No.: US 12,003,570 B2
(45) Date of Patent: *Jun. 4, 2024

(54) WEBTIER AS A SERVICE

(71) Applicant: ADP, Inc., Roseland, NJ (US)

(72) Inventors: Erik Palvadeau, Nanterre (FR); Nicolas Vigot, Blagnac (FR); Marc Tang, Nanterre (FR); Emeric Leblin, Nanterre (FR); Pierre Ibos, Blagnac (FR); Thierry Catalan, Nanterre (FR)

(73) Assignee: ADP, Inc., Roseland, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,381

(22) Filed: Mar. 14, 2023

(65) Prior Publication Data
US 2023/0231900 A1    Jul. 20, 2023

Related U.S. Application Data

(63) Continuation of application No. 17/304,898, filed on Jun. 28, 2021, now Pat. No. 11,616,827.

(51) Int. Cl.
*H04L 67/02* (2022.01)
*H04L 9/40* (2022.01)
*H04L 41/22* (2022.01)

(52) U.S. Cl.
CPC ............ *H04L 67/02* (2013.01); *H04L 63/029* (2013.01); *H04L 41/22* (2013.01)

(58) Field of Classification Search
CPC ........ H04L 67/02; H04L 63/029; H04L 41/22
See application file for complete search history.

(56) References Cited

U.S. PATENT DOCUMENTS

| | | | | |
|---|---|---|---|---|
| 8,032,940 | B1* | 10/2011 | Dhanani | G06F 21/6218 726/26 |
| 9,438,599 | B1* | 9/2016 | Yuhan | H04L 63/107 |
| 11,616,827 | B2* | 3/2023 | Palvadeau | H04L 41/0886 709/223 |
| 2003/0167405 | A1* | 9/2003 | Freund | H04L 63/20 709/223 |
| 2011/0173541 | A1* | 7/2011 | Carlson | H04L 41/0879 715/735 |

(Continued)

OTHER PUBLICATIONS

U.S. Corrected Notice of Allowance issued in corresponding U.S. Appl. No. 17/304,898, dated Dec. 21, 2022 (4 pages).

(Continued)

*Primary Examiner* — David R Lazaro
(74) *Attorney, Agent, or Firm* — Foley & Lardner LLP

(57) ABSTRACT

A method for automated web resource deployment is provided. The method comprises creating web resource publication requests, wherein each web resource publication request comprises a number of configuration changes necessary to publish a web resource, on a network, at a particular uniform resource location. A standard format, validation workflow, and an approval workflow are provided for automation of the web resource publication requests. Once validated and approved, web resource publication requests are automatically converted to API calls which are executed on backend servers to implement the configuration changes required in the environment without further human intervention.

20 Claims, 11 Drawing Sheets

(56) References Cited

U.S. PATENT DOCUMENTS

| | | | |
|---|---|---|---|
| 2012/0102543 A1* | 4/2012 | Kohli | H04L 63/20 726/1 |
| 2014/0215028 A1* | 7/2014 | Donner | H04L 41/16 709/220 |
| 2015/0095468 A1* | 4/2015 | Benny | G06F 9/45558 709/220 |
| 2016/0328222 A1* | 11/2016 | Arumugam | G06F 8/61 |
| 2018/0159845 A1* | 6/2018 | Aronov | H04L 63/0435 |
| 2019/0227856 A1* | 7/2019 | Xu | G06F 9/541 |
| 2019/0372844 A1* | 12/2019 | Moats | H04L 41/0806 |
| 2019/0386877 A1* | 12/2019 | Vaidya | H04L 41/0889 |
| 2019/0394286 A1* | 12/2019 | Chunduru Venkata | H04L 41/5048 |
| 2020/0073739 A1* | 3/2020 | Rungta | G06F 8/60 |
| 2020/0220875 A1* | 7/2020 | Harguindeguy | H04L 63/101 |
| 2021/0200814 A1* | 7/2021 | Tal | G06F 16/90335 |
| 2022/0417316 A1* | 12/2022 | Palvadeau | H04L 41/0866 |
| 2023/0231900 A1* | 7/2023 | Palvadeau | H04L 41/0886 709/223 |

OTHER PUBLICATIONS

U.S. Notice of Allowance issued in corresponding U.S. Appl. No. 17/304,898, dated Nov. 30, 2022 (7 pages).
U.S. Office Action issued in corresponding U.S. Appl. No. 17/304,898, dated May 11, 2022 (13 pages).
U.S. Office Action issued in corresponding U.S. Appl. No. 17/304,898, dated Oct. 6, 2022 (12 pages).

* cited by examiner

FIG. 4

WEBTIER AS A SERVICE

CROSS-REFERENCE TO RELATED APPLICATIONS

This application claims priority and benefit under 35 U.S.C. § 120 as a continuation of U.S. Ser. No. 17/304,898, filed Jun. 28, 2021, the contents of which are hereby incorporated by reference herein in entirety.

BACKGROUND INFORMATION

1. Field

The present disclosure relates generally to an improved computer system and, in particular, to a method and system for an improved dedicated webservice protection layer and automated web resource deployment.

2. Background

Many applications today instead of being compiled and installed on client computer systems are being deployed as a browser-based tool. These tools are then published to their audience internally via an organization's Intranet or externally via the public Internet. This method of application deployment creates security and configuration issues which are traditionally addressed by manual configuration and testing by specialized information technology teams. This process adds length to the deployment time and complexity to the deployment environment for standing up applications.

Therefore, it would be desirable to have a method and apparatus that take into account at least some of the issues discussed above, as well as other possible issues.

SUMMARY

An illustrative embodiment provides a computer-implemented method for web resource deployment. The method comprises receiving a web resource publication request from an authenticated client. The configuration change format in the received web resource publication request is validated through a workflow and approved for implementation. The approved web resource publication request is implemented by executing the requested configuration changes on a number of backend servers. This is accomplished by creating an appropriate application programming interface (API) call in response to the web resource publication request. The API call is sent to the appropriate backend servers for execution. A number of API call responses comprised of the execution results of the API call to the backend servers are received. The implemented configuration changes are stored in a version control central repository. The received API call responses are stored in a repository. A status for the web resource publication request is determined based on the stored API call responses. The evaluated web resource publication request status is sent to the authenticated client.

Another illustrative embodiment provides a system for web resource deployment. The system comprises a bus system, a storage device connected to the bus system, wherein the storage device stores program instructions, and a number of processors connected to the bus system, wherein the number of processors execute the program instructions to: receive a web resource publication request from an authenticated client; validate the format of the web resource publication request; approve the implementation of the web resource publishing request; execute configuration changes on a number of backend servers via an application programming interface (API) call in response to the web resource publication request; receive a number of API call responses from the backend servers in response to the web resource publication request; store configuration changes on a version control central repository; store the API call response; determine a request status of the web resource publication request based on the stored API call responses; and send the request status to the authenticated client.

Another illustrative embodiment provides a computer program product for web resource deployment. The computer program product comprises a computer-readable storage medium having program instructions embodied thereon to perform the steps of: receiving a web resource publication request from an authenticated client; validating the format of the web resource publication request; approving the implementation of the web resource publishing request; executing configuration changes on a number of backend servers via an application programming interface (API) call in response to the web resource publication request; receiving a number of API call responses from the backend servers in response to the web resource publication request; storing configuration changes on a version control central repository; storing the API call response; determining a request status of the web resource publication request based on the stored API call responses; and sending the request status to the authenticated client.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 is an illustration of an application development environment client user interface screen in accordance with an illustrative embodiment;

DETAILED DESCRIPTION

Figure 1:
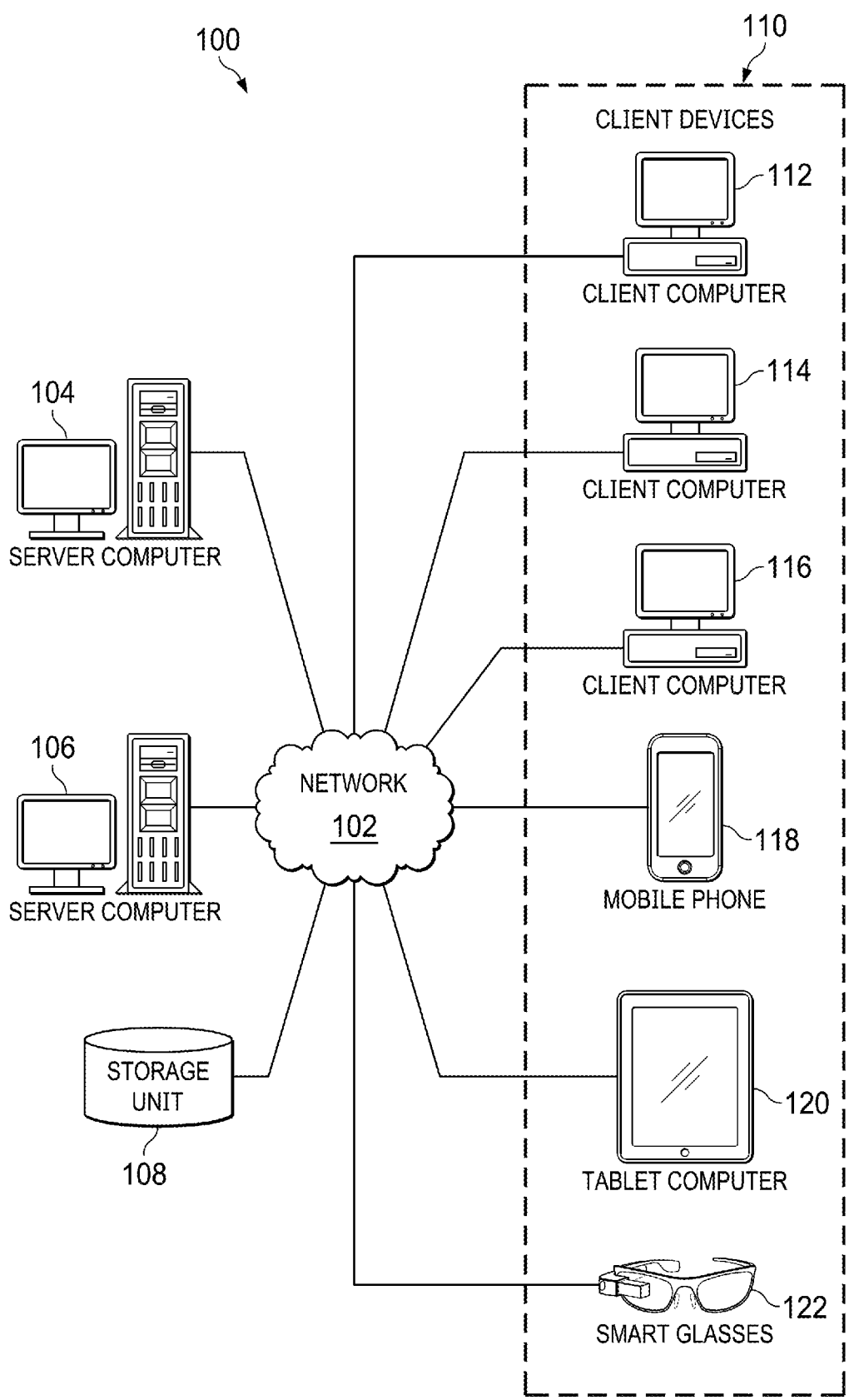
FIG. 1 is a pictorial representation of a network of data processing systems in which illustrative embodiments may be implemented.

The illustrative embodiments recognize and take into account one or more different considerations. For example, the illustrative embodiments recognize and take into account that typically multiple information technology support teams must manually design, configure, and test web resource deployments to ensure the security and integrity of the application and the networks they support. This is normally a time and labor intensive process which adds days or weeks to the web-based application deployment process. The illustrative embodiments recognize and take into account are security issues, especially for Internet deployed, public facing web applications which is why specialized tools and teams are typically required to deploy them.

The illustrative embodiments also recognize and take into account that web application developers do not have an easy way to securely and quickly deploy their web applications themselves once completed and must rely on others to manually intervene on their behalf. As a result, this reliance on others also slows down deployment of changes in existing web-based applications, since the change in the application can require going through the entire deployment process again.

The illustrative embodiments provide a self-service automation method that allows web-based application developers to submit web resource publication requests for automated review and implementation. A developer can create a web resource publication request through a user interface or through a programmatic API call. The interactive and programmatic interfaces allow application developers to create uniform resource locators (URLs), modify URLs, delete URLs, create uniform resource identifiers (URIs), modify URIs, delete URIs, create services, modify services, delete services, create LDAP entries, modify LDAP entries, delete LDAP entries, and validate subscriptions to web resources.

The web resource publication request format is verified and goes through an approval workflow. Once verified and approved, the configuration changes required by the web resource publication request are executed on backend servers which managing those sections of the network environment via application programming interface (API) calls to the appropriate backend server. The backend server executes the requested change and returns a status. The successful execution of the API call implements the configuration changes implemented, which allows for deployment level changes to network environments to be implemented and online within minutes instead of days.

The completed configuration changes are maintained in a version control central repository for data analysis and reporting purposes. Version control is maintained by storing a first file on the version control central repository, which represents the current configuration changes. If no file exists representing previous configuration changes, the first file is stored as a new file for a change type represented by the current configuration changes, and a new version number is associated with the new file. If a second file exists representing previous configuration changes, the first file is stored as a replacement file for a change type represented by the configuration changes. A new version number is associated with the new file, where the new version number equals an old version number of the second file incremented by a predefined value.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
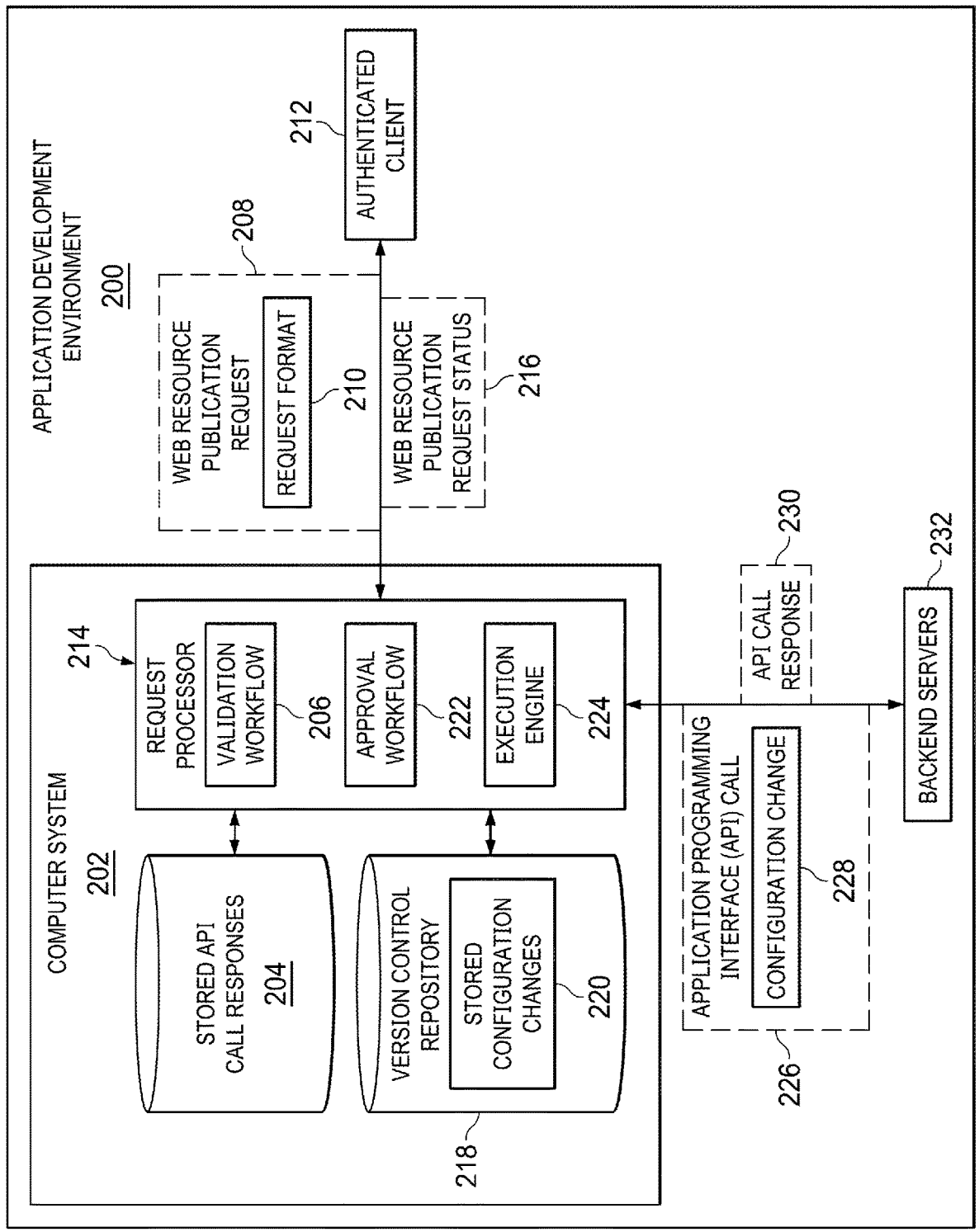
FIG. 2 is an illustration of a block diagram of an application development environment in accordance with an illustrative embodiment.

Turning to FIG. 2, a block diagram of an application development environment is depicted in accordance with an illustrative embodiment. Application development environment 200 might be implemented in network data processing system 100 in FIG. 1.

Application development environment 200 comprises a computer system 202, authenticated client 212, and backend servers 232. Computer system 202 is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

Within the computer system 202 are a request processor 214, an API call response storage 204, and a version control repository for storing configuration changes 220 that are verified, approved, and implemented by the computer system 202. The request processor manages a validation workflow 206, an approval workflow 222, and an execution engine 224.

An authenticated client 212 generates a web resource publication request 208 which has a specific request format 210 based on the type of web resource publication request 208 generated. The authenticated client 212 sends the web resource publication request 208 to the request processor 214 in computer system 202. The web resource publication request 208 is sent through the validation workflow 206 by the request processor 214. Once the web resource publication request 208 is successfully validated by the validation workflow 206 it is passed on to the approval workflow 222. Once the web resource publication request 208 is successfully approved by the approval workflow 222 it is passed on to the execution engine 224. If the validation workflow 206 or the approval workflow 222 fails, an appropriate web resource publication request status 216 is returned to the authenticated client 212.

The execution engine 224 converts validated and approved web resource publication requests 208 into an appropriate application programming interface (API) call 226. The API call 226 comprises the requested configuration change 228 to be implemented. The API call 226 is sent to an appropriate backend server 232 for processing. If the configuration change 228 is successfully implemented by the backend server 232 then an appropriate API Call Response 230 is sent by the backend server 232 to the execution engine 224. If the configuration change 228 is not implemented by the backend server 232 then an appropriate API Call Response 230 is sent by the backend server 232 to the execution engine 224.

The API Call response 230 received from the backend server 232 is stored in a repository for stored API Call responses 204. Configuration changes 228 which are successfully implemented are converted by the execution engine 224 into an appropriate web resource publication request status 216. The execution engine 224 then sends the web resource publication request status 216 to the authenticated client 212. Configuration changes 228 which are successfully implemented are also sent by the execution engine 224 to the version control repository 218. The version control repository 218 then creates a stored configuration change 220 based on the implemented configuration change 228.

Configuration changes 228 which are not successfully implemented are converted by the execution engine 224 into an appropriate web resource publication request status 216. The execution engine 224 then sends the web resource publication request status 216 to the authenticated client 212.

Application development environment 200 can be implemented in software, hardware, firmware, or a combination thereof. When software is used, the operations performed by application development environment 200 can be implemented in program code configured to run on hardware, such as a processor unit. When firmware is used, the operations performed by application development environment 200 can be implemented in program code and data and stored in persistent memory to run on a processor unit. When hardware is employed, the hardware may include circuits that operate to perform the operations in application development environment 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in computer system 202, which is a physical hardware system and includes one or more data processing systems. When more than one data processing system is present in computer system 202, those data processing systems are in communication with each other using a communications medium. The communications medium can be a network. The data processing systems can be selected from at least one of a computer, a server computer, a tablet computer, or some other suitable data processing system.

Request processor 214 might comprise one or more processors. As used herein a processor unit is a hardware device and is comprised of hardware circuits such as those on an integrated circuit that respond and process instructions and program code that operate a computer. When request processor 214 executes instructions for a process, one or more processors can be on the same computer or on different computers in computer system 202. In other words, the process can be distributed between processors on the same or different computers in computer system 202. Furthermore, one or more processors comprising request processor 214 can be of the same type or different type of processors. For example, request processor 214 can be selected from at least one of a single core processor, a dual-core processor, a multi-processor core, a general-purpose central processing unit (CPU), a graphics processing unit (GPU), a digital signal processor (DSP), or some other type of processor.

Figure 3:
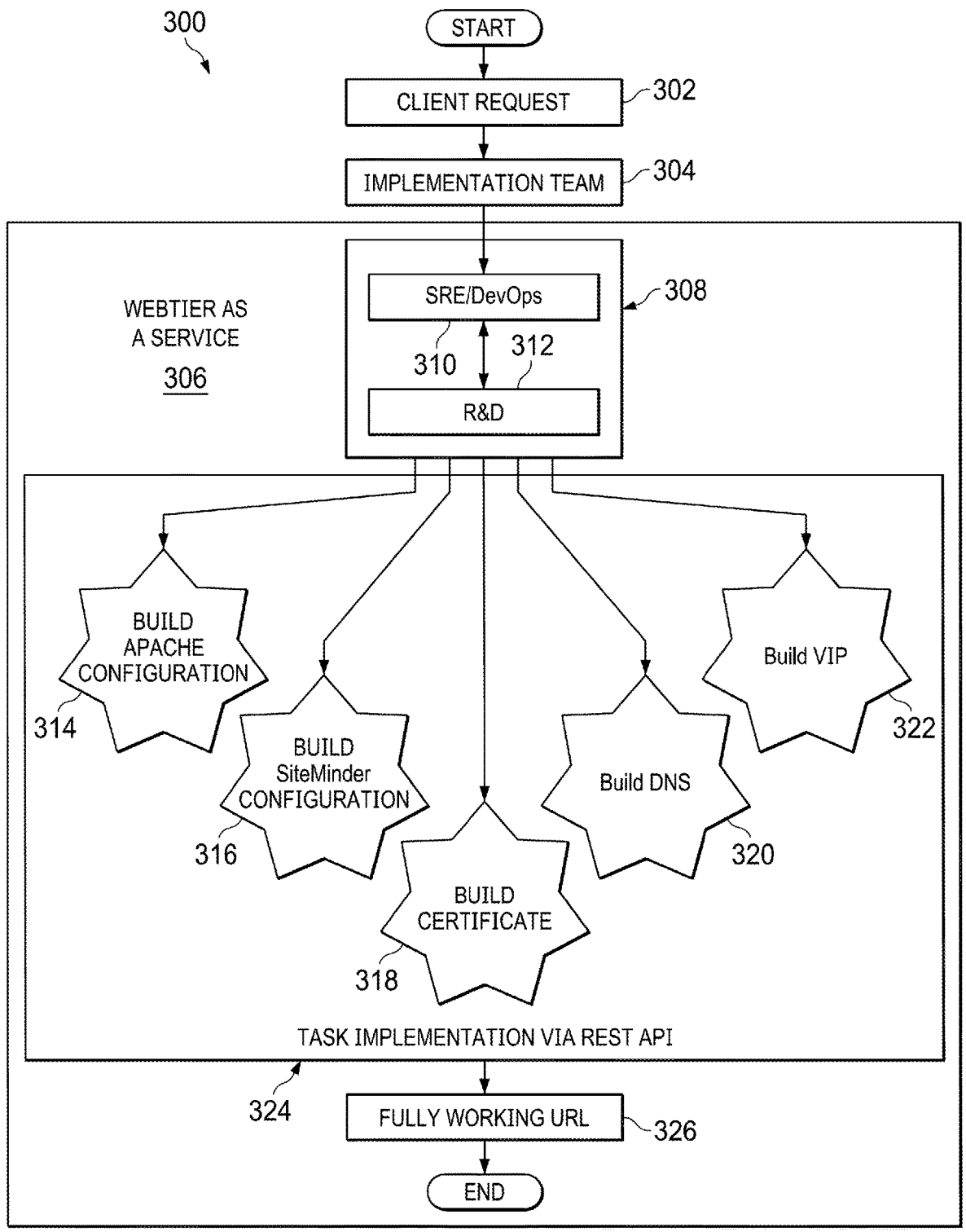
FIG. 3 is an illustration of a request flow from client to target web resource in accordance with an illustrative embodiment.

FIG. 3 depicts a flowchart for a process of managing request flows through a WebTier as a Service system in accordance with an illustrative embodiment. The process in FIG. 3 can be implemented in hardware, software, or both. When implemented in software, the process can take the form of program code that is run by one of more processor units located in one or more hardware devices in one or more computer systems. Process 300 might be implemented in application development environment 200 shown in FIG. 2.

Process 300 begins by an authenticated client of the system initiating a web resource publication request (step 302).

In one illustrative embodiment, the web resource publication request can be manually reviewed by a number of teams, for validation and/or approvals before being submitted for technical validation and approval (step 304). In another illustrative embodiment, the web resource publication request review and/or approval could be automated before the web resource publication request is submitted for technical validation and approval. In another illustrative embodiment, the need for the web resource publication request to be reviewed or approved before technical review submission could be eliminated.

The web resource publication request is then submitted into the WebTier as a Service process for technical validation and approval (step 306). In one illustrative embodiment, a number of information technology support teams review the web resource publication request and either approve or reject the web resource publication request (step 308). In another illustrative embodiment, the web resource publication request's technical review and/or approval could be automated. In another illustrative embodiment, the rules for technical validation and approval of the web resource publication request could be implemented programmatically.

Review and approval from a web environment support team may be required before the web resource publication request can advance (step 310).

Review and approval from a network environment support team may be required before the web resource publication request can advance (step 312).

Once all approvals are received, the configuration change requested by the web resource publication request is sent to a backend server as an implementation task via an application programming interface (API) call (step 324).

To process a web server configuration change, an API call is sent to an Apache configuration manager to implement the requested configuration change (step 314).

To process a web access configuration change, an API call is sent to an SiteMinder configuration manager to implement the requested configuration change (step 316).

To process a security certificate configuration change, an API call is sent to a certificate store manager to implement the requested configuration change (step 318).

To process a domain name services (DNS) configuration change, an API call is sent to a DNS configuration manager to implement the requested configuration change (step 320).

To process a Virtual IP (VIP) configuration change, an API call is sent to an VIP configuration manager to implement the requested configuration change (step 322).

Once all required configuration changes are completed, the fully configured web resource is brought online in the network environment (step 326). Process 300 then ends.

Figure 4:
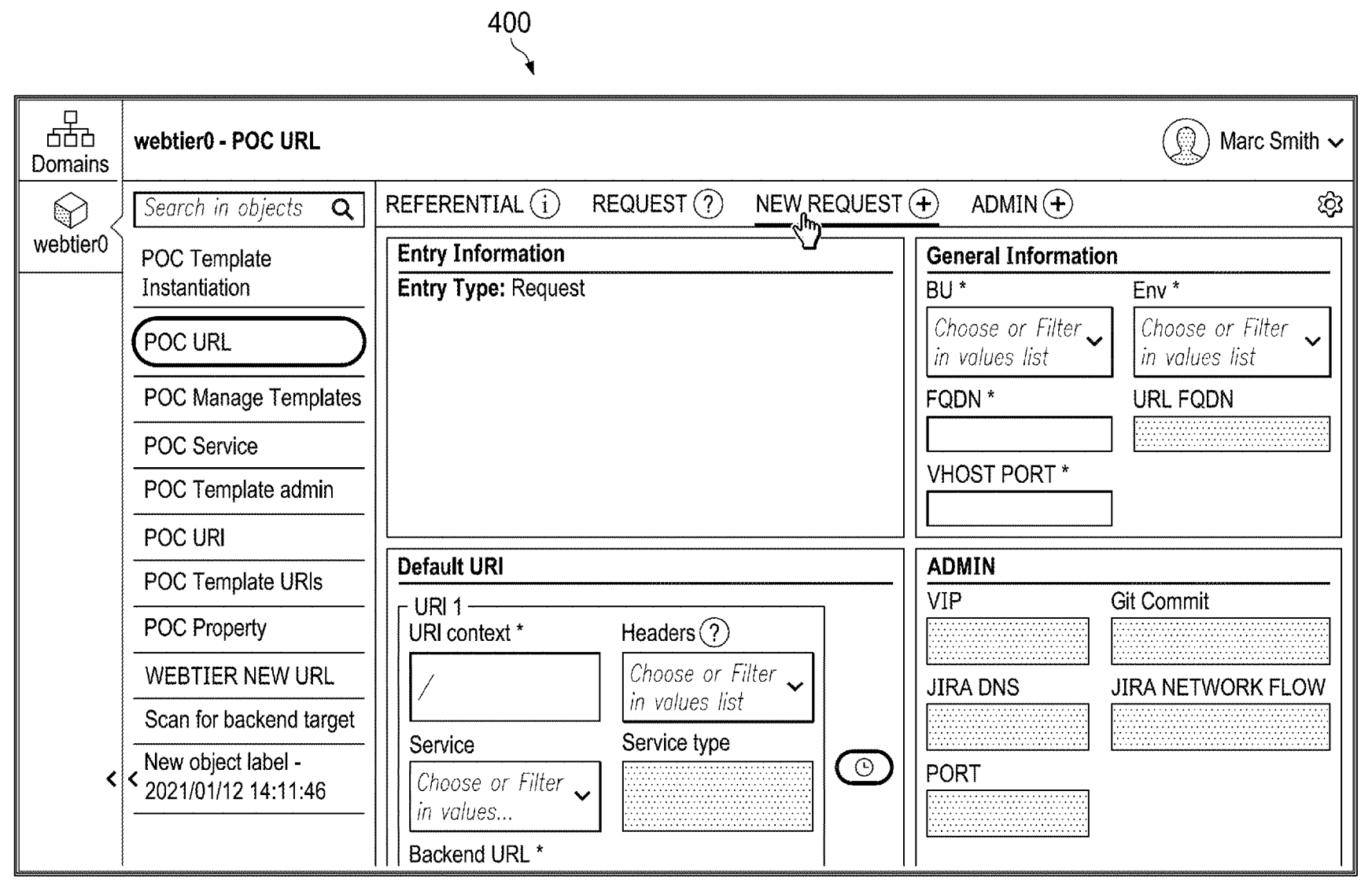

FIG. 4 is an illustration of a WebTier as a Service user interface allowing a web application developer to create a web resource publication request in accordance with an illustrative embodiment. The user interface in the illustrative embodiment can be used to collect, verify, and validate data from a number of data fields required to create, modify, or delete the web resource publication request. The data fields can be populated from user input or retrieval of existing data values from one or more central repositories.

Figure 5:
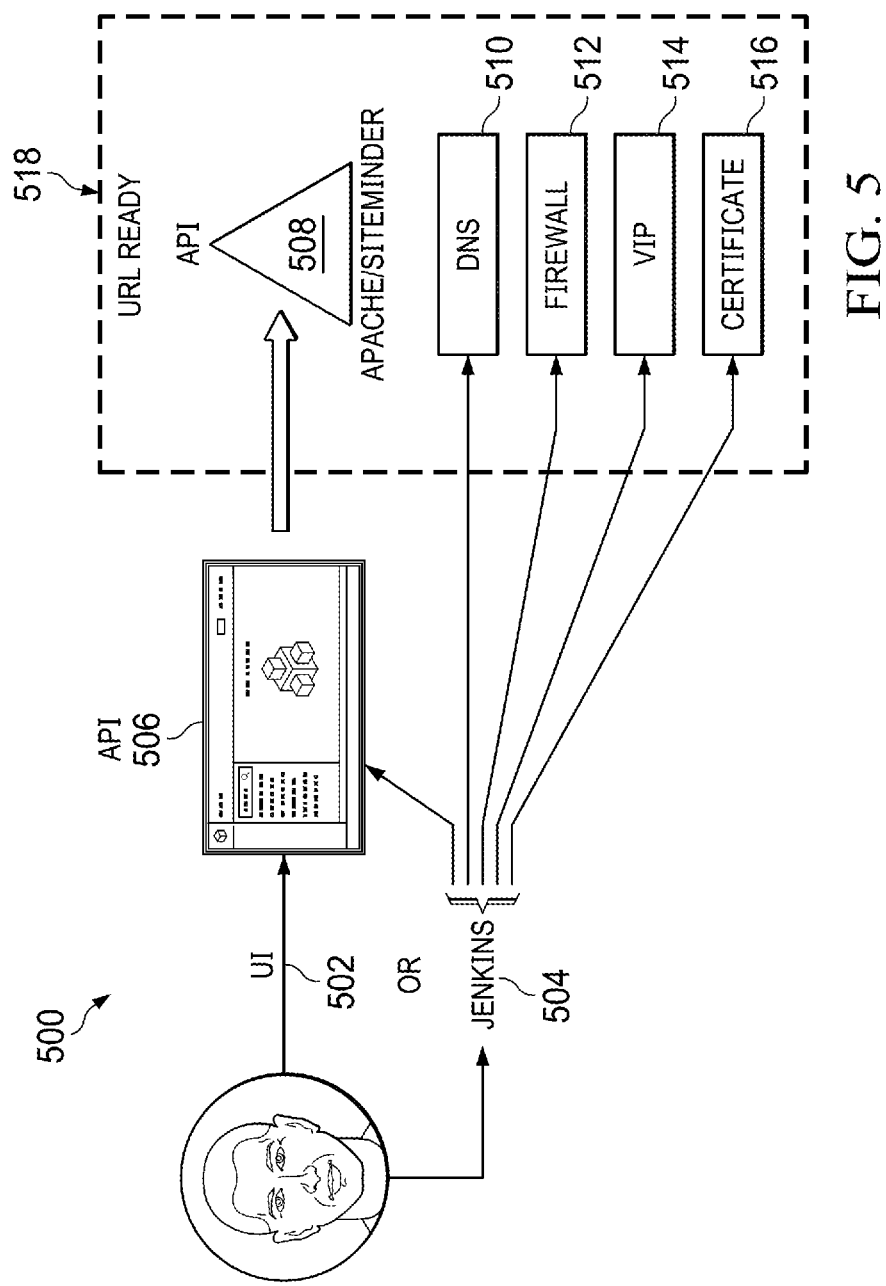
FIG. 5 if an illustration of a WebTier as a Service request flow overview in accordance with an illustrative embodiment.

FIG. 5 is an illustration of a request flowing through a WebTier as a Service environment from the web application developer to the completed URL in accordance with an illustrative embodiment. Process 500 starts with a user generating a web resource publication request. In one illustrative embodiment, the user can access a user interface 400 shown in FIG. 4 to initiate the web resource publication request (step 502).

In a different illustrative embodiment, the user can use a programming language or a build management language to generate the web resource publication request and submit the web resource publication request directly to the backend API server (step 504).

A deployment services backend server accepts the web resource publication request and converts it to a backend server API call. The deployment services backend server then sends the API call to the appropriate backend server (step 506).

Apache web server API calls are sent to an Apache Configuration Request Server to implement. SiteMinder API calls are sent to a SiteMinder Configuration Request Server to implement (step 508).

Domain Name Services (DNS) API calls are sent to a DNS Configuration Request Server to implement (step 510).

Firewall API calls are sent to a Firewall Configuration Request Server to implement (step 512).

Virtual IP (VIP) API calls are sent to a VIP Configuration Request Server to implement (step 514).

Certificate API calls are sent to a Certificate Configuration Request Server to implement (step 516).

Once all configuration requests have been completed by the backend servers, the web resource can be marked ready for publication (step 518). Process 500 then ends.

Figure 6:
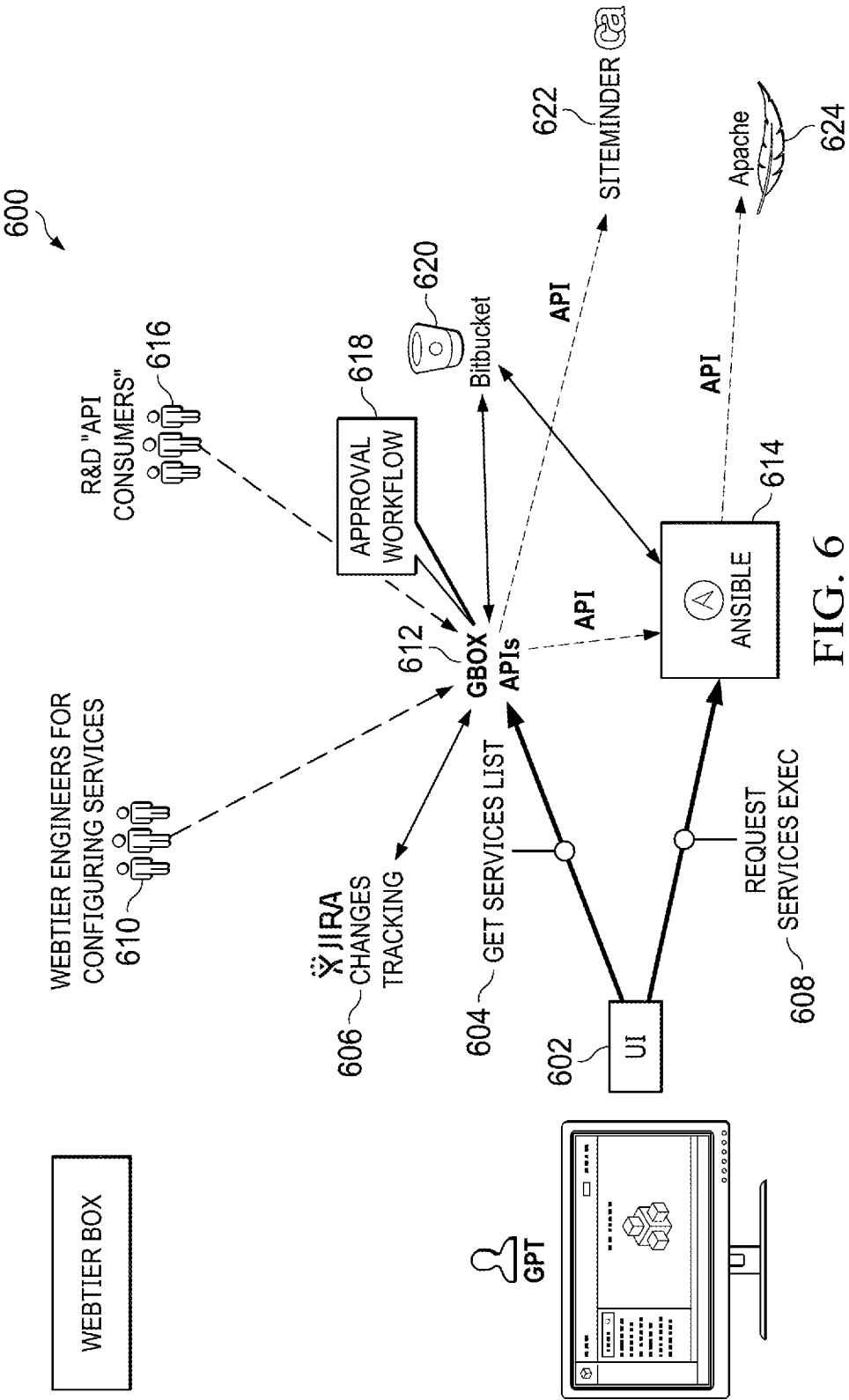
FIG. 6 is an illustration of WebTier as a Service environment overview in accordance with an illustrative embodiment.

FIG. 6 is an illustration of a WebTier as a Service environment in accordance with an illustrative embodiment. The environment in FIG. 6 can be implemented in hardware, software, or both. When implemented in software, the process can take the form of program code that is run by one of more processor units located in one or more hardware devices in one or more computer systems. Process 600 might be implemented in one or more of the server computers 104 shown in FIG. 1. Process 600 might be implemented in application development environment 200 shown in FIG. 2.

A web resource publication request 602 is generated by a user within a user interface 400 shown in FIG. 4. A list of available web resources 604 impacted by the web resource publication request 602 is requested from an execution engine 612 and sent to a deployment services backend server 614.

Information technology support teams 610 can submit web resource publication requests 602 through a user interface 400 shown in FIG. 4 or a programmatic API call to the execution engine 612 to process configuration changes in the environment.

Network environment support teams 616 can submit web resource publication requests 602 through a user interface 400 shown in FIG. 4 or a programmatic API call to the execution engine 612 to process configuration changes in the environment.

The web resource publication request 602 received by the execution engine 612 can also be put through an approval workflow 618 before being submitted to the deployment services backend server 614 for execution.

The web resource publication request 602 is sent to the deployment services backend server 614 for conversion to a backend server API call representing a requested configuration change for execution on the backend server.

The configuration change requested by the web resource publication request 602 is sent to the appropriate backend server for implementation either by the execution engine 612 directly to a backend server like SiteMinder 622 or through the deployment services backend server 614 to a backend server like Apache 624.

A change management central repository 606 records the requested, approved, and completed configuration changes to the environment. A version control central repository 620 stores the different versions of the configuration changes, API calls, and web resource publication requests 602 that are approved, implemented, and completed successfully in the environment. Process 600 then ends.

Figure 7:
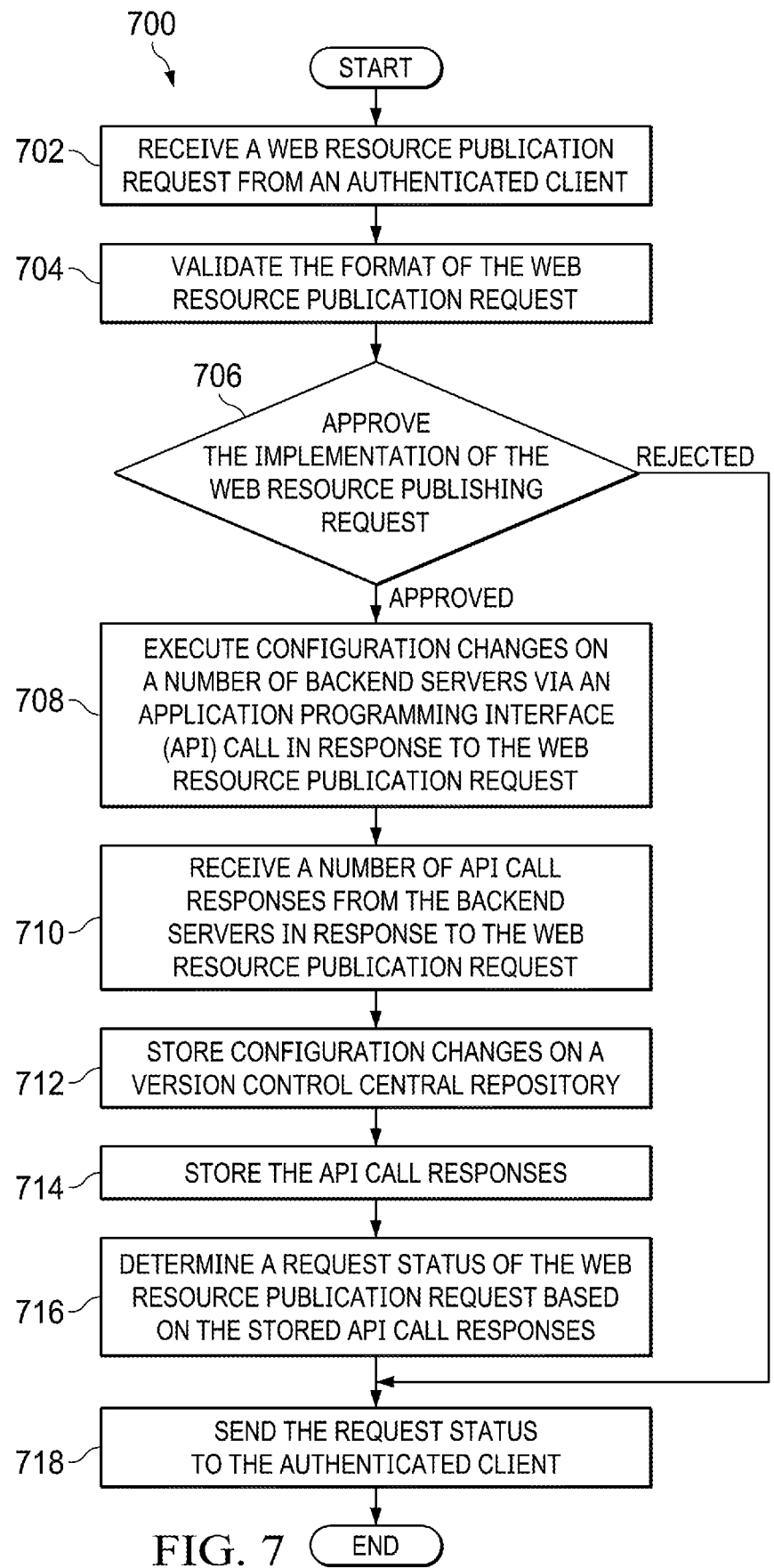
FIG. 7 a flowchart for a process of creating a WebTier as a Service system in accordance with an illustrative embodiment.

FIG. 7 depicts a flowchart for a process of creating a WebTier as a Service system in accordance with an illustrative embodiment. The process in FIG. 7 can be implemented in hardware, software, or both. When implemented in software, the process can take the form of program code that is run by one of more processor units located in one or more hardware devices in one or more computer systems. Process 700 might be implemented in application development environment 200 shown in FIG. 2.

Process 700 begins by receiving a web resource publication request from an authenticated client of the system (step 702).

The format of the web resource publication request received is validated (step 704). Once the web resource publication request has been validated it is submitted for approval (step 706). If the web resource publication request rejected, it is returned to the authenticated client with an appropriate web resource publication request status (step 718). Process 700 then ends.

If the web resource publication request is approved, it is sent to an execution engine to execute the requested configuration changes on a number of backend servers (step 708). Before sending the web resource publication request to the backend server, the request is converted into an application programming interface (API) call appropriate for the backend server receiving the request.

The backend server will send an API call response after it attempts to execute the API call. The backend server will format the API call response based on the success or failure of implementing the configuration change requested in the web resource publication request. The API call response will be sent back to the execution engine for further processing (step 710).

The execution engine stores the implemented configuration change in a version control central repository (step 712). The execution engine also stores the API call response received from the backend server (step 714).

Based on the API call response received and stored, a web resource publication request status for the web resource publication request is determined (step 716). The determined web resource publication request status is sent to the authenticated client (step 718). Process 700 then ends.

Figure 8:
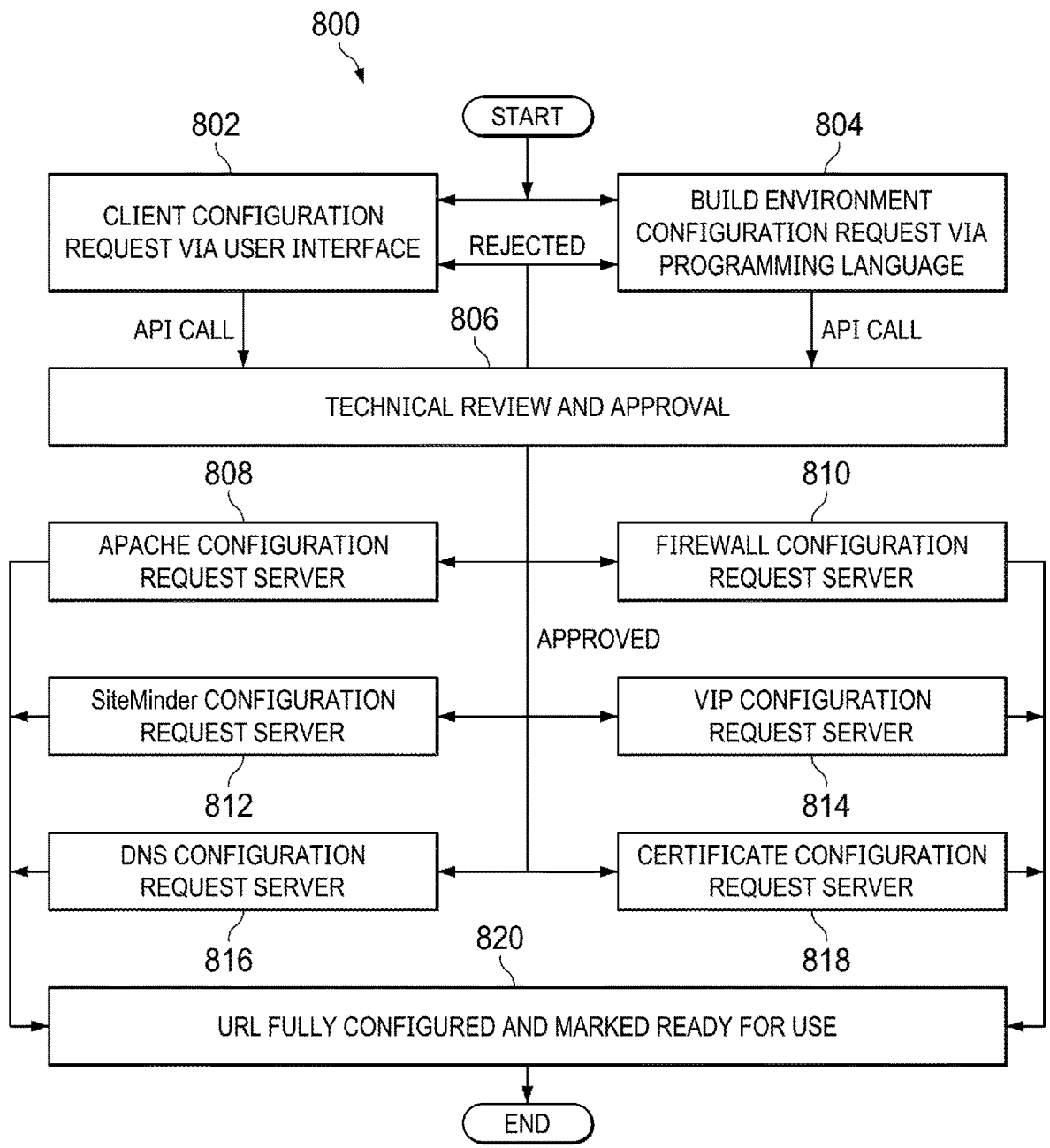
FIG. 8 depicts a flowchart for a process of managing the incoming configuration requests in accordance with an illustrative embodiment.

FIG. 8 depicts a flowchart for a process of managing the incoming configuration requests in accordance with an illustrative embodiment. Process 800 might be an additional process within steps 706 and 708 in FIG. 7.

Process 800 starts by a configuration request being received either through an API call from an authenticated client user interface (step 802) or a programmatic API call(step 804).

The request is submitted for a technical review and approval (step 806) by IT support, research and development, or other organizations placed in the validation or approval workflows. In one illustrative embodiment, the technical validation and approval are provided through user interface 400 shown in FIG. 4. In another illustrative embodiment, the technical validation and approval are provided through a programmatic response using an API call.

Approved Apache web server configuration requests are sent to an Apache Configuration Request Server to implement (step 808).

Approved SiteMinder configuration requests are sent to a SiteMinder Configuration Request Server to implement (step 812).

Approved Domain Name Services (DNS) server configuration requests are sent to a DNS Configuration Request Server to implement (step 816).

Approved Firewall configuration requests are sent to a Firewall Configuration Request Server to implement (step 810).

Approved Virtual IP (VIP) configuration requests are sent to a VIP Configuration Request Server to implement (step 812).

Approved Certificate configuration requests are sent to a Certificate Configuration Request Server to implement (step 818).

If the Uniform Resource Location (URL) is fully configured, meaning all required configuration requests have been successfully implemented by the appropriate request servers, then the URL is marked ready for use and brought online (step 820). Process 800 then ends.

Figure 9:
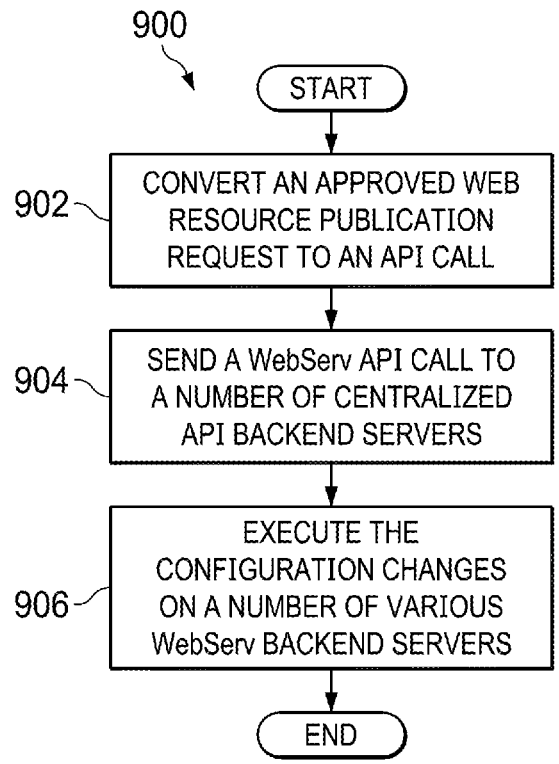
FIG. 9 depicts a flowchart for a process of executing configuration changes on a web server via a WebServ API call in accordance with an illustrative embodiment.

With reference next to FIG. 9, a flowchart or a process for executing configuration changes is depicted in accordance with an illustrative embodiment. The process in the flowchart in FIG. 9 is an example of one implementation for step 708 in FIG. 7 in which configuration changes are executed on a number of backend servers via an application programming interface (API) call in response to the web resource publication request.

As depicted, the approved web resource publication request is converted into an API call appropriate to the backend server, in this embodiment, a WebServ API call, required to execute the configuration change (step 902). The WebServ API call is sent to a number of centralized API backend servers (step 904). The WebServ API call is then sent to a number of WebServ backend servers, which execute the configuration changes (step 906). The process terminates thereafter.

Figure 10:
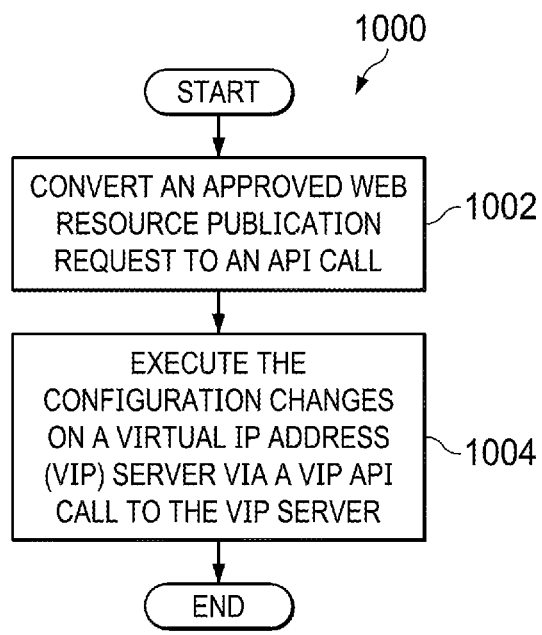
FIG. 10 depicts a flowchart for a process of executing configuration changes on a Virtual IP Address (VIP) server via a VIP API call in accordance with an illustrative embodiment.

With reference next to FIG. 10, a flowchart or a process for executing configuration changes is depicted in accordance with an illustrative embodiment. The process in the flowchart in FIG. 10 is an example of one implementation for step 708 in FIG. 7 in which configuration changes are executed on a number of backend servers via an application programming interface (API) call in response to the web resource publication request.

As depicted, the approved web resource publication request is converted into an API call appropriate to the backend server (step 1002). In the illustrative embodiment, the API call may be a Virtual IP Address (VIP) API call required to execute the configuration change. The VIP API call is sent to the VIP server, which executes the configuration changes (step 1004). The process terminates thereafter.

Figure 11:
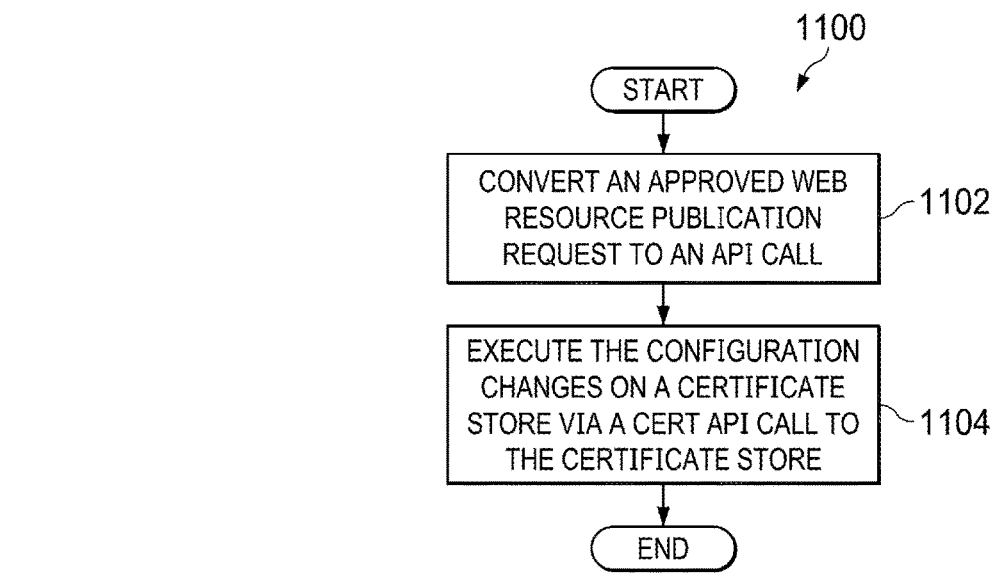
FIG. 11 depicts a flowchart for a process of executing configuration changes on a certificate store server via a CERT API call in accordance with an illustrative embodiment.

With reference next to FIG. 11, a flowchart or a process for executing configuration changes is depicted in accordance with an illustrative embodiment. The process in the flowchart in FIG. 11 is an example of one implementation for step 708 in FIG. 7 in which configuration changes are executed on a number of backend servers via an application programming interface (API) call in response to the web resource publication request.

As depicted, the approved web resource publication request is converted into an API call appropriate to the backend server (step 1102). In the illustrative embodiment, the API call may be a CERT API call required to execute the configuration change. The CERT API call is sent to the certificate store, which executes the configuration changes (step 1104). The process terminates thereafter.

Figure 12:
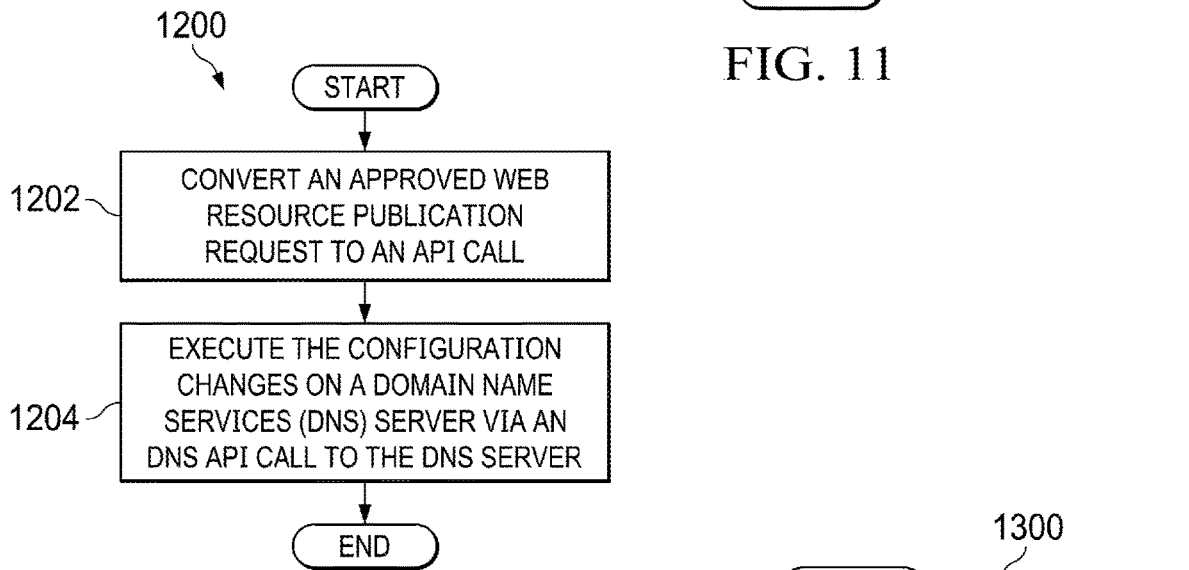
FIG. 12 depicts a flowchart for a process of executing configuration changes on a Domain Name Services (DNS) server via a DNS API call in accordance with an illustrative embodiment.

With reference next to FIG. 12, a flowchart or a process for executing configuration changes is depicted in accordance with an illustrative embodiment. The process in the flowchart in FIG. 12 is an example of one implementation for step 708 in FIG. 7 in which configuration changes are executed on a number of backend servers via an application programming interface (API) call in response to the web resource publication request.

As depicted, the approved web resource publication request is converted into an API call appropriate to the backend server (step 1202). In the illustrative embodiment, the API call may be a domain name services (DNS) API call, required to execute the configuration change. The DNS API call is sent to the DNS server, which executes the configuration changes (step 1204). The process terminates thereafter.

Figure 13:
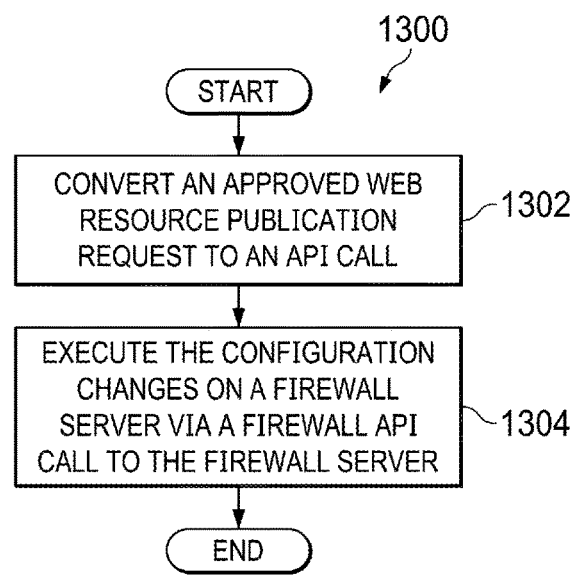
FIG. 13 depicts a flowchart for a process of executing configuration changes on a firewall server via a firewall API call in accordance with an illustrative embodiment.

With reference next to FIG. 13, a flowchart or a process for executing configuration changes is depicted in accordance with an illustrative embodiment. The process in the flowchart in FIG. 13 is an example of one implementation for step 708 in FIG. 7 in which configuration changes are executed on a number of backend servers via an application programming interface (API) call in response to the web resource publication request.

As depicted, the approved web resource publication request is converted into an API call appropriate to the backend server (step 1302). In the illustrative embodiment, the API call may be a firewall API call, required to execute the configuration change. The firewall API call is sent to the firewall server, which executes the configuration changes (step 1304). The process terminates thereafter.

Figure 14:
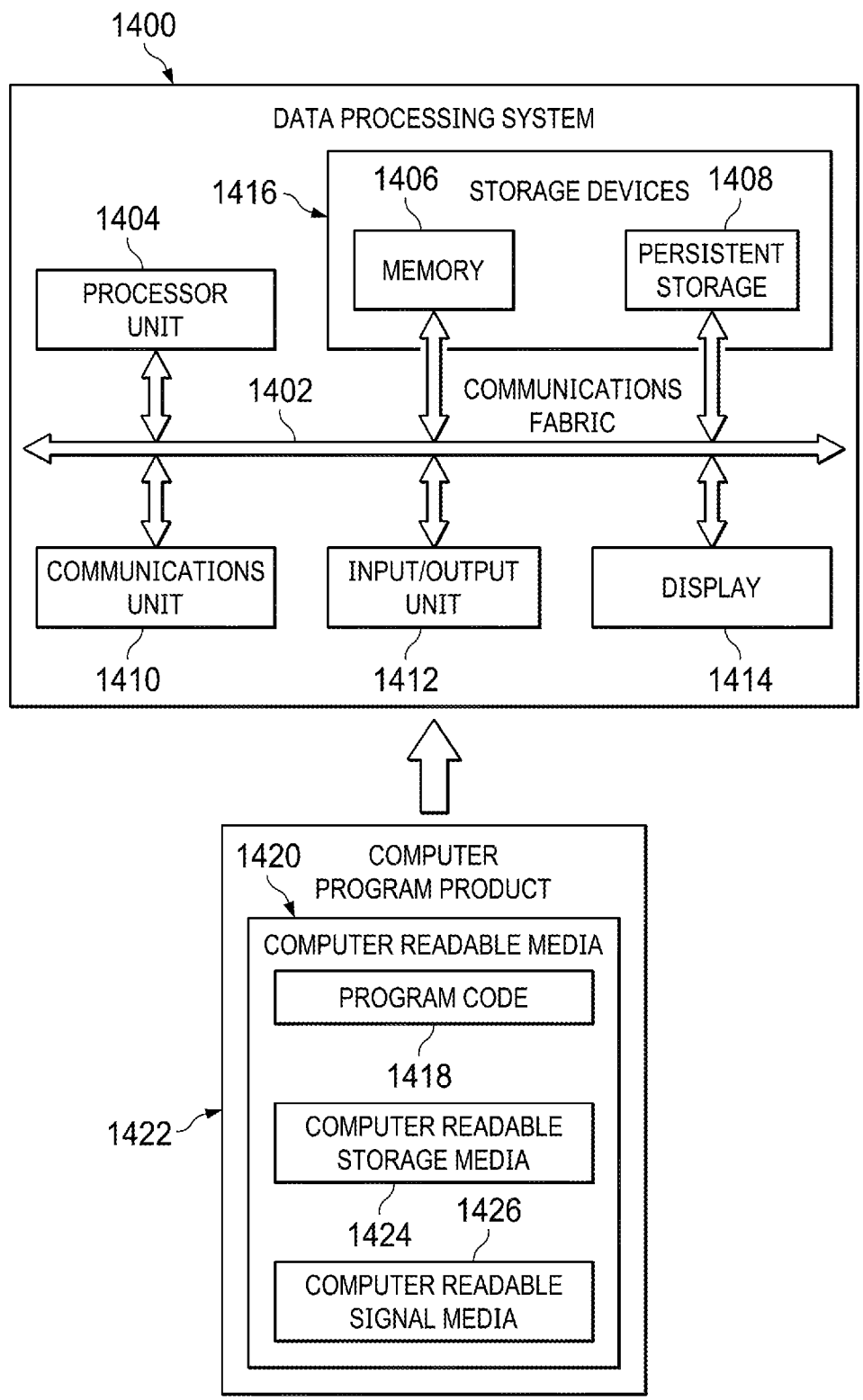
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 may be used to implement one or more computers shown in FIG. 1 (e.g., client devices 110 and servers 104, 106) and application development environment 200 in FIG. 2. In this illustrative example, data processing system 1400 includes communications framework 1402, which provides communications between processor unit 1404, memory 1406, persistent storage 1408, communications unit 1410, input/output unit 1412, and display 1414. In this example, communications framework 1402 may take the form of a bus system.

Processor unit 1404 serves to execute instructions for software that may be loaded into memory 1406. Processor unit 1404 may be a number of processors, a multi-processor core, or some other type of processor, depending on the particular implementation. In an embodiment, processor unit 1404 comprises one or more conventional general-purpose central processing units (CPUs). In an alternate embodiment, processor unit 1404 comprises one or more graphical processing units (CPUs).

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, may be, for example, a random access memory or any other suitable volatile or non-volatile storage device. Persistent storage 1408 may take various forms, depending on the particular implementation.

For example, persistent storage 1408 may contain one or more components or devices. For example, persistent storage 1408 may be a hard drive, a flash memory, a rewritable optical disk, a rewritable magnetic tape, or some combination of the above. The media used by persistent storage 1408 also may be removable. For example, a removable hard drive may be used for persistent storage 1408. Communications unit 1410, in these illustrative examples, provides for communications with other data processing systems or devices. In these illustrative examples, communications unit 1410 is a network interface card.

Input/output unit 1412 allows for input and output of data with other devices that may be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs may be located in storage devices 1416, which are in communication with processor unit 1404 through communications framework 1402. The processes of the different embodiments may be performed by processor unit 1404 using computer-implemented instructions, which may be located in a memory, such as memory 1406.

These instructions are referred to as program code, computer-usable program code, or computer-readable program code that may be read and executed by a processor in processor unit 1404. The program code in the different embodiments may be embodied on different physical or computer-readable storage media, such as memory 1406 or persistent storage 1408.

Program code 1418 is located in a functional form on computer-readable media 1420 that is selectively removable and may be loaded onto or transferred to data processing system 1400 for execution by processor unit 1404. Program code 1418 and computer-readable media 1420 form computer program product 1422 in these illustrative examples. In one example, computer-readable media 1420 may be computer-readable storage media 1424 or computer-readable signal media 1426.

In these illustrative examples, computer-readable storage media 1424 is a physical or tangible storage device used to store program code 1418 rather than a medium that propagates or transmits program code 1418. Alternatively, program code 1418 may be transferred to data processing system 1400 using computer-readable signal media 1426.

Computer-readable signal media 1426 may be, for example, a propagated data signal containing program code 1418. For example, computer-readable signal media 1426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1400 are not meant to provide architectural limitations to the manner in which different embodiments may be implemented. The different illustrative embodiments may be implemented in a data processing system including components in addition to or in place of those illustrated for data processing system 1400. Other components shown in FIG. 14 can be varied from the illustrative examples shown. The different embodiments may be implemented using any hardware device or system capable of running program code 1418.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The illustrative embodiments provide method for predicting changes in customer demand. The method comprises collecting subscription data for a number of customers at specified time intervals, wherein each customer is subscribed to one of a number of defined bundles of services. The method further comprises determining any changes in customer bundle subscriptions during a given time interval, and determining metrics for defined customer tasks for subscribed services during the given time interval. From this data, the method simultaneously models, via multimodal multi-task learning, bundle subscription change events and time-to-event for each bundle subscription change. The method then predicts, according to the modeling, types and timing of changes in customer bundle subscriptions based on customer service activities. By predicting both the types of changes in bundles subscriptions and the timing of those changes, the illustrative embodiments allow proactive steps to be taken to assist customers in making changes or to mitigate negative changes. Such proactive steps might comprise targeted marketing or incentive to customers or speeding up changes to bundle subscriptions. The anticipatory, proactive steps can provide cost and time savings for both customers and service providers.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method, comprising:
   receiving, by one or more processors, a web resource publication request from a client, the web resource publication request having a format;
   validating, by the one or more processors, the format of the web resource publication request;
   approving, by the one or more processors, implementation of the web resource publication request;
   converting, by the one or more processors, the web resource publication request to a number of application programming interface (API) calls;
   receiving, by the one or more processors responsive to transmission of the number of API calls, a number of API call responses, the number of API call responses including a status of implementing a number of configuration changes;

determining, by the one or more processors using the number of API call responses, a request status of the web resource publication request; and sending, by the one or more processors, the request status of the web resource publication request to the client.

2. The method of claim 1, wherein the number of API call responses include one of a first format responsive to a backend server successfully implementing the number of configuration changes and a second format responsive to the backend server unsuccessfully implementing the number of configuration changes.

3. The method of claim 1, further comprising:
generating, responsive to determining implementation of the number of configuration changes, information pertaining to the number of configuration changes;
storing, in a database, the information pertaining to the number of configuration changes; and
updating, responsive to receiving a second number of API call responses, the information pertaining to the number of configuration changes to reflect a second number of configuration changes.

4. The method of claim 1, wherein a web resource acted on by the web resource publication request comprises one of:
a uniform resource locator (URL);
a uniform resource identifier (URI);
a service; and
a subscription.

5. The method of claim 1, wherein an action requested by the web resource publication request comprises one of:
creating;
modifying;
viewing;
workflow approval; and
deleting.

6. The method of claim 1, wherein the number of API calls comprise one of:
web service API;
Firewall API;
certificate API;
VIP API; and
DNS API.

7. The method of claim 1, wherein the client comprises one of:
a user logged into a user interface; and
a programmatic API call.

8. The method of claim 1, wherein the format of the web resource publication request comprises one of:
a URL name;
a service name;
a LDAP name;
a server identifier;
a VIP identifier; and
a port number.

9. The method of claim 1, wherein the number of configuration changes are executed on a Virtual IP Address (VIP) server via a VIP API call to the VIP server.

10. The method of claim 1, wherein the number of configuration changes are executed on a certificate store via a certificate API call to the certificate store.

11. A system comprising one or more memory devices storing instructions that, when executed by one or more processors, cause the one or more processors to:
receive a web resource publication request from a client, the web resource publication request having a format;
validate the format of the web resource publication request;
approve implementation of the web resource publication request;
convert the web resource publication request to a number of application programming interface (API) calls;
receive, responsive to transmission of the number of API calls, a number of API call responses, the number of API call responses including a status of implementing a number of configuration changes;
determine, using the number of API call responses, a request status of the web resource publication request; and
send the request status of the web resource publication request to the client.

12. The system of claim 11, wherein the number of API call responses include one of a first format responsive to a backend server successfully implementing the number of configuration changes and a second format responsive to the backend server unsuccessfully implementing the number of configuration changes.

13. The system of claim 11, wherein the instructions cause the one or more processors to:
generate, responsive to determining implementation of the number of configuration changes, information pertaining to the number of configuration changes;
store, in a database, the information pertaining to the number of configuration changes; and
update, responsive to receiving a second number of API call responses, the information pertaining to the number of configuration changes to reflect a second number of configuration changes.

14. The system of claim 11, wherein a web resource acted on by the web resource publication request comprises one of:
a uniform resource locator (URL);
a uniform resource identifier (URI);
a service; and
a subscription.

15. The system of claim 11, wherein an action requested by the web resource publication request comprises one of:
creating;
modifying;
viewing;
workflow approval; and
deleting.

16. The system of claim 11, wherein the number of API calls comprise one of:
web service API;
Firewall API;
certificate API;
VIP API; and
DNS API.

17. A non-transitory computer readable storage media having instructions stored thereon that, when executed by one or more processors, cause the one or more processors to implement operations comprising:
receiving a web resource publication request from a client, the web resource publication request having a format;
validating the format of the web resource publication request;
approving implementation of the web resource publication request;
converting the web resource publication request to a number of application programming interface (API) calls;
receiving, responsive to transmission of the number of API calls, a number of API call responses, the number of API call responses including a status of implementing a number of configuration changes;

determining, using the number of API call responses, a request status of the web resource publication request; and sending the request status of the web resource publication request to the client.

18. The non-transitory computer readable storage media of claim 17, wherein the number of API call responses include one of a first format responsive to a backend server successfully implementing the number of configuration changes and a second format responsive to the backend server unsuccessfully implementing the number of configuration changes.

19. The non-transitory computer readable storage media of claim 17, the operations further comprising:

generating, responsive to determining implementation of the number of configuration changes, information pertaining to the number of configuration changes;

storing, in a database, the information pertaining to the number of configuration changes; and updating, responsive to receiving a second number of API call responses, the information pertaining to the number of configuration changes to reflect a second number of configuration changes.

20. The non-transitory computer readable storage media of claim 17, wherein a web resource acted on by the web resource publication request comprises one of:

a uniform resource locator (URL);
a uniform resource identifier (URI);
a service; and
a subscription.

* * * * *